Patented Feb. 17, 1942

2,273,038

UNITED STATES PATENT OFFICE 2,273,038

POLYMERIZATION OF GASES

Eugene J. Houdry, Ardmore, and James P. Daugherty, Jr., Swarthmore, Pa., assignors to Houdry Process Corporation, Wilmington, Del., a corporation of Delaware No Drawing. Application November 9, 1938, Serial No. 239,632

8 Claims. (Cl. 196—10)

This invention relates to the production of desirable liquid products from hydrocarbon compounds which are normally gaseous but comprise or contain unsaturates or olefins capable of polymerization or which can be converted into unsaturates or olefins. This application is a substitute for and continuation-in-part of our copending application, Serial No. 109,680, filed November 7, 1936, with the same title.

One object of the invention is the conversion of gaseous hydrocarbons into high quality liquid hydrocarbons useful as motor fuels. Another object is to effect the transformation or polymerization in an economical manner by the action of catalysts at low temperatures. Another object is to produce a high yield of low boiling hydrocarbon liquids in the gasoline boiling range having good antiknock rating and high blending value. Another object is the production of liquids higher boiling than gasoline, including power kerosene, and a still higher boiling liquid having unusual characteristics. Still another object is the utilization of polymerization in combination with other operations to produce maximum yields of desirable products, such as motor fuels. Other objects will be apparent from the detailed discussion which follows.

The invention is characterized by a liquid phase catalytic operation at low temperature for converting hydrocarbon gases into liquids. Various catalysts including those of a silicious nature may be utilized. A sufficient pressure is imposed to present the charge in liquid phase and to maintain liquid phase conditions throughout the polymerizing operation. Some of the liquid in the charge is non-reactive with the catalyst and acts as a solvent for extracting polymers from the catalyst. The operation may be conducted as a single pass, as a series of successive and distinct passes, or with recirculation in liquid phase of the unpolymerized material with or without the addition of fresh charge until an equilibrium is reached. In series of passes and in recirculating operations it is preferable to remove polymers continuously at one or more points.

The charging material for the polymerizing reaction may comprise any gas composed of or containing unsaturates. The gases from cracking, distilling and other operations in the treatment of materials comprising or containing hydrocarbons are suitable, also blends of gases from various oil refining steps and from the processing of coal, shale, etc., also synthetically prepared hydrocarbons resulting from chemical reactions including hydrogenation, also natural or other gases which have been cracked or dehydrogenated to produce unsaturates. A good charge is the normal propane-butane cut of refinery gas, but the amount of propane in the charge must be limited to that which remains dissolved in the liquefied charge under the conditions of operation. Hence, when working on a butane cut at or near the critical temperature of butane, it is at times necessary to remove propane from the charge in order to have the same in liquid phase. For a good operation, it is also important that the sulphur content of the charge be kept low, as not in excess of a total sulphur equivalent of 8 grams of hydrogen sulphide per 100 cu. ft. of charge. It is preferable to reduce the sulphur content to the equivalent of 5 grams, or less, of hydrogen sulphide by desulphurizing the charge in any known or desirable manner. Often a simple but thorough caustic washing is sufficient.

The charge, ready for polymerization, is sent, at a temperature below its critical temperature, into a catalytic zone which is maintained below the critical temperature of the hydrocarbons therein; the range of desirable temperatures is 50° to 300° F. according to the charge. The preferential range for producing the highest yield of light or low boiling hydrocarbons in the gasoline boiling range is 180° to 300° F. for a butane cut. The reaction is exothermic and the temperature of the catalyst may be maintained substantially constant or may be allowed to rise within the aforesaid range during the reaction period, and even up to or somewhat beyond 300° F. provided that a liquid phase condition is maintained in the reaction zone. Proper temperature control is essential to the operation, and accuracy of control is of importance in determining the amount and nature of the polymers produced.

The charge is fed to the reaction zone in liquid phase and maintained under sufficient pressure in said zone so that the mingled charge and products of reaction remain in liquid phase. The pressure may range up to 700 pounds per square inch. For a suitable charge and the preferential operating range of 180° to 300° F. to produce gasoline, a pressure of about 450 or 500 pounds per square inch is sufficient.

The rate of feed of the charge to the polymerizing reaction zone may vary quite widely depending upon the type and quantity of unsaturates in the charge and upon the kind of products desired. An advantageous range of feed rates is from 20 to about 200 cubic feet of gas per hour per liter of catalyst. At optimum temperatures and charging rates of 25 up to 212 cubic feet of gas per hour, from 90 to 95% of the isobutylenes in the charge will be polymerized; at rates above 212 the polymerization percentage drops off. The percentage of polymerization of normal or n-butylenes at optimum temperatures is about 60 at a charging rate of 25 cubic feet of gas per hour, the percentage gradually falling at higher charging rates until it levels off at about 25% for charging rates above 212 cubic feet per hour. Charging rates below 20 cubic feet per hour are usually undesirable or uneconomical because they require a larger and hence costlier plant, give heavy polymers outside the gasoline boiling range, and produce faster poisoning of the catalyst necessitating shorter runs and more frequent interruptions to regenerate the catalyst.

The feed rate may be increased as the percentage of unsaturates in the charge decreases. Recycling, as compared with a once-through operation, increases gasoline yield and reduces the production of heavy polymers. When recycling or recirculating material along with fresh charge through the reaction zone to reach an equilibrium, the ratio of recycled material to fresh charge may range up to 5:1, a good ratio with fresh charge containing approximately 30% unsaturates being about 1½:1.

The best feed rate will usually depend upon how much excess butane is available in a refinery and will usually be selected to give a maximum production of gasoline. This normally calls for a feed rate in the range of 25 to 125 cubic feet of gas per hour per liter of catalyst, and especially in the preferential range of 50 to 100 cubic feet. A good average feed rate is about 50 cubic feet combined with recycling.

A variety of contact materials may be utilized as catalysts to effect the desired polymerizing reaction under the above operating conditions. Among the best are active blends of silica and alumina of natural or artificial origin. For example, adsorbent clayey materials including activated clays, such as those sold under the trade names "Filtrol" and "Superfiltrol," may be utilized, also clays which have undergone a more drastic chemical treatment to remove impurities therein and to change the silica to alumina ratio, including clays which have been heavily acid-treated to reduce the alumina content to 7% and below. The catalysts are preferably provided in lumps, fragments or molded pieces of substantially uniform size to facilitate regeneration. Silica gel may be utilized upon which active oxides have been deposited, including alumina. A catalyst which is especially suitable is one produced synthetically, containing only silica and alumina in the weight ratio of about 9:1. Such a catalyst can be produced in known manner by the interaction of a soluble silicate and a soluble alum, and is prepared in the form of grains or molded pieces.

The catalyst may be arranged in a deep bed for straight-through flow of reactants from end to end, or it may have perforated conduits distributed symmetrically and in spaced parallel relation within and all through the bed of contact material for uniform distribution of charged fluids and/or removal of products. The use of one series of perforated conduits is illustrated in U. S. Patent No. 1,987,904 of E. J. Houdry, issued January 15, 1935, and the use of two series of conduits to produce parallel flow throughout the mass is illustrated in U. S. Patent No. 2,042,468, issued June 2, 1936, to E. J. Houdry. All of these types of converters operate satisfactorily, but regeneration of the catalytic mass in situ is facilitated by the use of the perforated conduits embedded in the mass. To effect the desirable close temperature control of the mass, any suitable means may be employed. One means involves the utilization of a heat exchange medium circulated through the mass in heat exchange relation therewith, as by one or more coils or conduits embedded in or extending through the mass. The preferred method of heat exchange with the mass is by conduction. Any suitable material may be utilized as the heat exchange medium and may be in gaseous or liquid phase or in a combination of these phases, such for example as stack gases, water, water and steam, mercury, fused salts, etc. The reaction is to be controlled so that a liquid phase condition is maintained at all times in the reaction chamber and the operating temperature may vary with the total conversion per pass. A desirable manner of control is to adjust the inlet temperature so as to regulate the top or maximum temperature of the reaction. As the reaction is exothermic the inlet temperature will be lower than the converter temperature and hence it is possible to run with a top or maximum temperature in the converter above the critical temperature of the charge but not of the mingled charge and reaction products within the converter. Thus the charge, depending on its composition, may be sent into the converter at a charging temperature in the range of atmospheric to 300° F. The top temperature in the case can be anywhere from 100° to 300° F., or somewhat above 300° F. Excellent yields are obtained at top temperatures of 180° F. and above. When the charge is predominantly butanes, the preferential range of top converter temperatures is 275° to 325° F. The requisite liquid phase operation is readily established since the critical temperatures of the various components of charge and products are substantially as follows:

|  | °F. |
|---|---|
| Propane | 190 |
| Butane | 300 |
| Heavy polymers (average) | 625 |

Failure to control temperatures or to impose sufficient pressure to maintain liquid phase operation reduces yield of desired products and increases poisonous deposits on the catalyst.

The reaction zone may be continued in operation from a few minutes to several days, as may be desired. The preferred period of operation is from four to eight hours, two or more reaction zones alternately on stream and in regeneration being provided to permit continuous operation. Limiting factors in determining the on-stream period include the desired frequency of regeneration and/or the amount and character of the polymers desired. The latter factor may depend, to a certain extent, upon local refining or marketing conditions. In any event, the run should be stopped before the contaminating deposits on the catalyst resulting from the operation exceed 20 grams per liter of catalyst, or about 3% by weight of the catalyst. In the usual operation, the run is stopped when 10 grams or less of resinous or other burnable deposit per liter of catalyst has been formed. Regeneration is effected in known manner as by solvent extraction or by oxidation, but when oxidation is used, care must be taken that the temperature of the mass be not allowed to go much above 1050° F., in order to avoid impairing the activity of the mass. After such a regeneration, the mass is cooled down to the proper on-stream temperature, care being taken to see that it is thoroughly dried and free from moisture before the feeding of charge in liquid phase is resumed. The "on-stream" period will be governed largely by the time necessary for cycle operation.

The above polymerizing operation produces both low boiling and high boiling liquids. Typical products which may be obtained by fractionation are as follows:

*Gasoline.*—A typical gasoline cut, as for example of 400° F. end point, has a color of 30+, is stable to oxidation and color changes, has low gum content, as of the order of 1 to 2 mg. copper dish method, has a C. F. R. motor method octane rating above 80 and a blending value above 90 and in some cases up to 125 octane.

*Kerosene.*—A naphtha cut in the boiling range of about 450 to 575° F. (which is usually about 35% of the polymers heavier than gasoline) makes a power kerosene with an octane rating of above 80.

*Bottoms.*—The remaining material in the boiling range of about 550 to 710° F. has an A. P. I. gravity of about 37°, a molecular weight of the order of 250, a Saybolt viscosity at 100° F. of about 963 seconds, and at 210° F. of about 58 seconds, and a low pour point as −10° F. or below. The Johansen iodine addition and substitution numbers are very low (one sample giving .006 and .165, respectively). The aniline point is high, namely, around 190° F. The last two characteristics indicate that this material is paraffinic, while the steep viscosity temperature curve is indicative of naphthenic or aromatic character. This peculiar material cracks very easily with a high yield of gasoline.

By using the above described liquid phase operation, it is possible to polymerize some 90% of the isobutylenes and from 40 to 50% or more of the n-butylenes in the charge during each pass or recirculation period, and to recover 95% or more of the unsaturates transformed as liquid, the usual yield being 99%. Of the polymers recovered, from 50 to 85% or even more will be in the gasoline boiling range, the highest percentages resulting when the preferential temperature range of 180 to 300° F. is utilized. In general, increasing the rate of feed without varying the temperature effects a change in the character of the polymers without necessarily effecting a change in their quantity; as the rate is increased, the percentage of gasoline tends to increase. On the other hand, when temperatures are increased while the rate of feed is held constant, the polymers tend to become heavier.

The following typical and specific examples illustrate practical operations in accordance with the present invention:

*Example 1*

A charge comprising a normal propane butane cut of refinery gas containing 22% unsaturates was fed in substantially complete liquid phase and under a pressure of about 500 lbs. per sq. in. gauge to a reaction zone containing the above described synthetic catalyst containing silica and alumina in the weight ratio of about 9:1, at a rate of the order of 20 cu. ft. of gas per hour per liter of catalyst, the temperature of the reaction zone being held at about 225° F. This was a single pass operation of about 17 hours duration. The polymers were fractionated and comprised about 85% of 410° F. E. P. butane-free gasoline having an octane rating of about 84 (C. F. R. M. M.), a color of 30 and about 15% of high boiling polymers having a boiling range of the order of 460° to 620° F. and an A. P. I. gravity of about 41°. The latter fraction was essentially a power kerosene having an octane rating of better than 80. About 35% of the unsaturates present in the charge were polymerized, about 99% of the affected unsaturates being recovered as liquid. After the run was stopped the amount of resinous deposit on the catalyst was determined and was found to be about 12.6 grams per liter of catalyst.

*Example 2*

A refinery propane butane fraction containing approximately 25% unsaturates was subjected to a polymerizing operation involving the use of two reaction zones, each one containing an absorbent contact mass comprising an activated clay containing approximately 6½% alumina. The fresh charge, under a pressure of the order of 500 lbs. per sq. in. gauge, in substantially complete liquid phase, was continuously admitted to the first of these zones, which was maintained at a temperature of about 200° F. The material leaving the first zone was fractionated to separate polymers from tail gases. The latter, under a pressure of the order of 500 lbs. per sq. in., were charged to the second reaction zone, which was maintained at a temperature of approximately 225° F., the products from which were fractionated and the tail gases recirculated or added to the charge to that zone at a ratio of approximately one and a half volumes of tail gas to one volume of charge. The above operation was conducted for a period of about 8 hours, during which time the rates of charge to the first and second zones were 20 and 50 cu. ft. of gas per hour per liter of catalyst, respectively. The polymers obtained by the fractionation were combined and represented approximately 80% of the unsaturates present in the fresh charge. Upon fractionation, these polymers were found to contain approximately 90% of 410° F. E. P. gasoline having a Reid vapor pressure of the order of 9 lbs. per sq. in., an octane rating of about 84, a color of approximately 30, and approximately 10% higher boiling material having substantially the same properties as indicated above in the discussion on the high boiling polymer residue. At the end of the run the catalyst in each reaction zone was found to contain about 10 grams per liter of high boiling resinous material which was removed by regeneration.

*Example 3*

A charge of the following composition by volume—propane 4.8%, iso-butylene 19%, n-butylene 24.5% and butanes 51.7%—was fed in liquid phase under 500 lbs. per sq. in. pressure for four hours to a reaction zone containing the above described synthetic silica-alumina catalyst at a charging rate of fifty (50) cu. ft. of gas per hour per liter of catalyst. The maximum temperature in the reaction chamber was 300° F. 92% of the iso-butylenes and 49% of the n-butylenes were polymerized, or 68% of the total unsaturates. Of the polymers, 88% was butane-free gasoline of 400° F. end point having an 84 octane rating. The polymer products, both light and heavy, conformed to the previous detailed descriptions. The resinous deposit on the catalyst was 6.5 grams per liter.

Example 4

The same charge as in Example 3 was treated under identical conditions except that the feed rate was 75 cu. ft. per hour per liter of catalyst. 62% of the unsaturates were polymerized, of which 90% was butane-free gasoline of 400° F. end point.

A further increase in the charging rate to 100 cu. ft. per hour resulted in polymerization of 60% of the unsaturates but increased the gasoline content of the same to 91%.

The charging rate was then increased to 212 cu. ft. of gas per hour per liter of catalyst and the on-stream period was reduced to 1¾ hours. The polymerization of the iso-butylene was still above 90% but the polymerization of the n-butylenes dropped to 27%, giving a total polymerization of unsaturates of 57%; the percentage of butane-free gasoline of 400° F. end point then rose to 94%.

Example 5

A charge of the following composition by volume—propane 5.5%, iso-butylene 17.2%, n-butylene 22.1%, butanes 55.2%—was sent in liquid phase under 500 lbs. per sq. in. pressure for two hours to a reaction chamber containing an active synthetic silica-alumina catalyst at a charging rate of 100 cu. ft. of gas per hour per liter of catalyst. The maximum temperature in the reaction chamber was held at approximately 205° F. 50% of the unsaturates in the charge were polymerized to liquid of which 93% was butane-free gasoline of 400° F. end point.

The same operation conducted with a maximum catalyst temperature of 305° F. and with a charging rate of 108.9 cu. ft. of gas per hour per liter of catalyst polymerized 62% of the unsaturates in the charge to liquid. Of the latter, 89.6% was butane-free 400° F. end point gasoline and the remaining 10.4% was heavier polymers of the type previously described.

Recycling of tail gas or unpolymerized material along with fresh charge in a 2:1 ratio was effected in the lower temperature operation and in a 2½:1 ratio in the higher temperature operation.

Resinous deposits on the catalyst from the operations described under Examples 4 and 5 were in all instances less than 10 grams per liter of catalyst and generally of the order of 6 grams per liter.

We claim as our invention:

1. In the production of polymer gasoline from normally gaseous hydrocarbons by the action of catalysts, the process steps of sending a charge containing at least 20% olefins to a catalytic reaction zone at a rate in excess of 20 cubic feet of gas per hour per liter of catalyst, subjecting the charge to a pressure in excess of 300 lbs. per square inch, and subjecting the charge in liquid phase and under reaction conditions to the action of a contact mass comprising a blend of silica and alumina in the weight ratio of about 9:1 and maintained above 180° F. but below the critical temperature of the hydrocarbons in contact therewith.

2. Process of polymerizing a gaseous hydrocarbon charge containing olefins and having a sulphur content not in excess of about 5 grams of hydrogen sulphide per 100 cu. ft. of charge to produce desirable liquid products therefrom which comprises subjecting the charge to a pressure of from 300 to 700 lbs. per square inch to reduce it to liquid phase condition, then subjecting the charge at a feed rate above 25 cu. ft. of gas per hour per liter of catalyst but not in excess of 212 cu. ft. of gas per hour per liter to the action of a silica-alumina polymerizing catalyst maintained within the temperature range of 180° to 300° F. so as to insure continuous liquid phase operation, and recirculating the unpolymerized portion of the charge through the reaction zone until a condition of equilibrium is reached, stopping the feeding of the hydrocarbon charge before the contaminating deposit on the catalyst reaches 3% by weight of the catalyst, removing the deposit by an oxidizing regenerating operation, and restoring the catalyst to the above temperature range and in completely dry condition before resuming the feeding of the hydrocarbon charge thereto.

3. Process of polymerizing a gaseous hydrocarbon charge containing olefins to produce desirable liquid products by the action of a contact mass adapted for regeneration by oxidation, the process comprising subjecting the charge to pressure up to 700 pounds per square inch to reduce it to liquid phase condition, sending the charge while in liquid phase through a polymerizing catalyst comprising a blend of silica and alumina maintained within the temperature range of 50° to about 300° F., feeding the charge to the catalytic zone in the range of 25 to 75 cubic feet of gas per hour per liter of catalyst, stopping the feeding of the hydrocarbon charge before the contaminating deposit reaches 3% by weight of the catalyst, regenerating the catalyst by oxidation to remove said deposit in preparation for another polymerizing period, and resuming feeding of the charge only when the catalyst has been cooled to the above temperature range as well as completely dried and freed of moisture.

4. Process of polymerizing a gaseous hydrocarbon charge containing olefins to produce desirable liquid products which comprises subjecting the charge to a pressure of about 450 pounds per square inch, then passing the charge in liquid phase and under reaction conditions through a reaction zone containing a contact mass comprising essentially silica and alumina in controlled ratio and maintained in the temperature range of 180° to about 300° F., stopping the operation when the resinous or other contaminating deposit is about 10 grams per liter of contact mass, regenerating the mass and then cooling and drying it in preparation for another polymerizing run.

5. Process of polymerizing a gaseous hydrocarbon charge containing olefins and having a total sulphur content not in excess of about 5 grams of hydrogen sulphide per 100 cu. ft. of charge to produce a maximum yield of polymer gasoline which comprises subjecting the charge to pressure sufficient to reduce it to liquid phase condition, sending the liquefied charge at a rate equivalent to about 50 cu. ft. of gas per hour per liter of catalyst into a reaction zone containing a polymerizing catalyst comprising silica and alumina in controlled ratio, maintaining a top temperature in the reaction zone of about 300° F., and stopping the operation to regenerate the catalyst in preparation for another run before the deposit on the catalyst exceeds 20 grams per liter of catalyst.

6. Process of polymerizing a gaseous hydrocarbon charge containing olefins capable of polymerization which comprises desulphurizing the charge to reduce its total sulphur content to the equivalent of at least 8 grams of hydrogen sulphide per 100 cu. ft. of charge, subjecting the desulphurized charge to sufficient pressure to put it in liquid phase, sending the liquefied charge through a reaction zone containing a polymerizing catalyst, controlling said zone so that its maximum temperature does not exceed the critical temperature of the mingled charge and reaction products thereby to insure a continuous liquid phase operation, feeding the charge to the reaction zone at a rate equivalent to at least 20 cu. ft. of gas per hour per liter of catalyst, stopping the feeding of the hydrocarbon charge before the contaminating deposit reaches 3% by weight of the catalyst, regenerating the catalyst by oxidation at temperatures in excess of those for the polymerizing reaction, and resuming the feeding of the charge only when the catalyst is again at proper polymerizing temperature as well as completely dry and free from moisture.

7. In the polymerization of olefinic hydrocarbons in a gaseous hydrocarbon charge to produce desirable liquid products by contacting the charge at low temperature but under pressure and in liquid phase with a polymerizing catalyst consisting essentially of silica and alumina in controlled ratio, the steps of selecting an operating temperature for the catalyst between 50 and 300° F. and a feed rate between 20 and 75 cubic feet of gas per hour per liter of catalyst, and thereafter increasing the rate of feed while maintaining the operating tmperature constant so as to increase the yield of polymers in the gasoline boiling range.

8. In the polymerization of gaseous hydrocarbon charge containing olefins to produce desirable liquid products by contacting the charge at low temperature but under pressure and in liquid phase with a polymerizing catalyst consisting essentially of silica and alumina in controlled ratio, the steps of selecting an operating temperature for the catalyst between 50 and 300° F. and a feed rate between 20 and 75 cubic feet of gas per hour per liter of catalyst, and thereafter increasing the operating temperature while maintaining the feed rate constant so as to increase the yield of polymers higher boiling than gasoline.

EUGENE J. HOUDRY.
JAMES P. DAUGHERTY, Jr.